United States Patent
Muir et al.

(10) Patent No.: US 10,527,026 B2
(45) Date of Patent: Jan. 7, 2020

(54) GEOTHERMAL HEAT RECOVERY FROM HIGH-TEMPERATURE, LOW-PERMEABILITY GEOLOGIC FORMATIONS FOR POWER GENERATION USING CLOSED LOOP SYSTEMS

(71) Applicant: GreenFire Energy Inc, Emeryville, CA (US)

(72) Inventors: Mark P. Muir, Emeryville, CA (US); Brian S. Higgins, Emeryville, CA (US); Joseph A. Scherer, Emeryville, CA (US); Alan D. Eastman, Emeryville, CA (US)

(73) Assignee: GreenFire Energy Inc., Emeryville, CA (US)

( * ) Notice: Subject to any disclaimer, the term of this patent is extended or adjusted under 35 U.S.C. 154(b) by 22 days.

(21) Appl. No.: 16/079,768

(22) PCT Filed: Feb. 25, 2016

(86) PCT No.: PCT/US2016/019612
§ 371 (c)(1),
(2) Date: Aug. 24, 2018

(87) PCT Pub. No.: WO2017/146712
PCT Pub. Date: Aug. 31, 2017

(65) Prior Publication Data
US 2019/0055930 A1    Feb. 21, 2019

(51) Int. Cl.
*F24T 10/20* (2018.01)
*F24T 10/10* (2018.01)
*F03G 7/04* (2006.01)

(52) U.S. Cl.
CPC ............... *F03G 7/04* (2013.01); *F24T 10/10* (2018.05); *F24T 10/20* (2018.05); *Y02E 10/14* (2013.01); *Y02E 10/16* (2013.01)

(58) Field of Classification Search
CPC . F03G 7/04; Y02E 10/10; Y02E 10/12; Y02E 10/125; Y02E 10/14; Y02E 10/16;
(Continued)

(56) References Cited

U.S. PATENT DOCUMENTS 3,824,793 A    7/1974  Matthews
3,935,102 A    1/1976  Swearingen
(Continued)

FOREIGN PATENT DOCUMENTS

JP    2000-161198 A    6/2000
JP    2014051856 A  *  3/2014

OTHER PUBLICATIONS

International Search Report issued in PCT/US2016/019612 dated Nov. 22, 2016 (2 pages).
(Continued)

*Primary Examiner* — Mark A Laurenzi
*Assistant Examiner* — Xiaoting Hu
(74) *Attorney, Agent, or Firm* — Osha Liang LLP (57) ABSTRACT

A method or apparatus that uses a fluid in a closed loop well system to extract heat from geothermal resources that are located in or near high-temperature, low-permeable geologic formations to produce power. In some embodiments, the closed loop system may include one or more heat exchange zones, where at least a portion of the one or more heat exchange zones may be disposed within a subterranean region having a temperature of at least 350° C. The subterranean region may be within a plastic zone or within 1000 meters of the plastic zone, the plastic zone having a temperature gradient of at least 80° C. per kilometer depth.

18 Claims, 6 Drawing Sheets

(58) Field of Classification Search
CPC .......... Y02E 10/18; F24T 10/00; F24T 10/10; F24T 10/13; F24T 10/15; F24T 10/17; F24T 10/20
See application file for complete search history.

(56) References Cited

U.S. PATENT DOCUMENTS

| | | | |
|---|---|---|---|
| 3,951,794 A | | 4/1976 | Swearingen |
| 4,201,060 A | * | 5/1980 | Outmans .................. F03G 7/04 60/641.2 |
| 5,515,679 A | * | 5/1996 | Shulman .................. F03G 7/04 60/641.2 |
| 6,035,949 A | | 3/2000 | Altschuler et al. |
| 6,668,554 B1 | * | 12/2003 | Brown ................ E21B 41/0064 60/641.2 |
| 7,059,131 B2 | | 6/2006 | Hildebrand |
| 7,849,690 B1 | | 12/2010 | Lakic |
| 8,281,591 B2 | | 10/2012 | Lakic |
| 8,650,875 B2 | | 2/2014 | Wiggs et al. |
| 2006/0026961 A1 | | 2/2006 | Bronicki |
| 2007/0245729 A1 | | 10/2007 | Mickleson |
| 2010/0180593 A1 | | 7/2010 | Schaller et al. |
| 2010/0272515 A1 | | 10/2010 | Curlett |
| 2011/0048005 A1 | | 3/2011 | McHargue |
| 2011/0067399 A1 | | 3/2011 | Rogers et al. |
| 2012/0144829 A1 | | 6/2012 | Wiggs et al. |
| 2012/0174581 A1 | | 7/2012 | Vaughan et al. |
| 2013/0192816 A1 | | 8/2013 | Wiggs |

OTHER PUBLICATIONS

Written Opinion of the International Searching Authority issued in PCT/US2016/019612 dated Nov. 22, 2016 (9 pages).

* cited by examiner

GEOTHERMAL HEAT RECOVERY FROM HIGH-TEMPERATURE, LOW-PERMEABILITY GEOLOGIC FORMATIONS FOR POWER GENERATION USING CLOSED LOOP SYSTEMS

FIELD OF THE DISCLOSURE

Embodiments disclosed herein relate generally to method or apparatus that uses a fluid in a closed loop to extract heat from geothermal resources that are located in high-temperature, low-permeable geologic formations to produce power.

BACKGROUND

Various open loop and closed loop systems for the extraction of geothermal energy have been proposed. Several patents and patent publications describing these may include, for example, U.S. Pat. Nos. 3,824,793, 3,935,102, 3,951,794, US20100272515, U.S. Pat. Nos. 8,281,591, 7,849,690, US20130192816, JP2000161198, U.S. Pat. Nos. 8,650,875, 6,668,554, US20110048005, U.S. Pat. No. 7,059,131, US20110067399, US20120144829, US20130192816, US20120174581, US20100180593, and US20070245729, among others.

Typical open loop systems rely upon a fluid, such as water or carbon dioxide, to fracture and traverse through a subterranean formation, where direct heat transfer with the surrounding rock increases the temperature of the fluid. The heated fluid is then recovered from the formation and used, for example, to generate electricity by extracting heat from a portion of the heated fluid or expanding the fluid.

Existing open loop systems proposed to utilize rock formations having relatively high permeability. Commercial geothermal power production projects access geothermal energy within high permeability areas, such as fault zones, within the brittle zone. These projects extract energy from geothermal reservoirs using geothermal brine with open loop systems. The geologic resource temperature is typically between 150° C. and 300° C. The minimum necessary permeability for such projects is normally about $10^{-6}$ m$^2$. The practical effect of this is that commercial projects are restricted to a small percentage of the brittle zone in areas in which temperature, permeability, and geothermal brine are all present in sufficient degree. Such geothermal systems are also constrained by depth because permeability rapidly decreases with depth, which suggests that there is a vertical limit to which hydrothermal projects can extend before the permeability becomes too low for projects to have adequate flow to sustain operations. In other words, hydrothermal projects cannot simply go "deeper" and/or "hotter" to improve heat extraction.

Environmental concerns and losses to the environment, among other factors, resulted in the consideration of naturally low permeability rock to "contain" a fluid, such as proposed in U.S. Pat. No. 6,668,554. The permeability of the low permeability rock, however, was locally increased to provide for mass transfer through the formation and recovery of the heated fluid. Even in these systems, a need for permeable rock is taught as necessary.

Typical closed loop systems include a fluid loop that passes through a hot subterranean formation. Even in such systems, it is generally considered necessary to fracture the formation to provide for both convective and conductive indirect heat transfer to the fluid contained within the closed loop system. Increased permeability of the formation near the closed loop system is generally considered by one skilled in the art as necessary for convective currents to form within the formation, enhancing the heat transfer. As a result of the general consensus in the art, only resources that were generally considered suitable for open loop systems were considered suitable for the closed loop systems, essentially envisioned as an overlapping resource selection.

SUMMARY OF THE DISCLOSURE

Contrary to the above considerations, it has been found that low permeability formations, including those in the plastic region, may be used to efficiently and effectively produce geothermal energy. Embodiments disclosed herein are directed towards methods and apparatus for the production of power from a non-permeable geological resource, through the use of a closed loop design, where the fluid is fully isolated from the formation in a closed loop well and heat is transferred through the well casing into the fluid. Embodiments disclosed herein extract heat from a resource, but do not rely on the geological permeability of the resource, whether natural or stimulated, and are not subject to drilled wells that quickly lose productivity. The embodiments disclosed herein are designed to take advantage of the typical permeability and ductile characteristics of rock as the temperature and pressure increases at greater depth than prior art has contemplated.

In one aspect, embodiments disclosed herein relate to a geothermal well. The geothermal well may include a closed loop system containing a fluid. The closed loop system may include one or more heat exchange zones for heating the fluid, where at least a portion of one or more of the heat exchange zones may be disposed within a subterranean region having a temperature of at least 350° C. The subterranean region may be within a plastic zone or within 1000 meters of the plastic zone, the plastic zone having a temperature gradient of at least 80° C. per kilometer depth.

In another aspect, embodiments disclosed herein relate to a method for producing power. The method may include providing a closed loop system including an injection zone, a heat exchange zone for heating a fluid contained within the closed loop system, and a production zone. The heat exchange zone or a portion thereof is within a subterranean region having a temperature of at least 350° C., the subterranean region being within a plastic zone or within 1000 meters of the plastic zone, the plastic zone having a temperature gradient of at least 80° C. per kilometer depth. The method may further include: injecting the fluid into the injection zone; circulating the fluid through the heat exchange zone to produce a heated fluid; recovering the heated fluid from the production zone; and converting thermal energy contained in the recovered heated fluid in a power production facility.

In another aspect, embodiments disclosed herein relate to a geothermal well. The geothermal well may include: a closed loop system containing a fluid, the closed loop system including a heat exchange zone for heating the fluid, wherein at least a portion of the heat exchange zone is disposed within a region of hot impermeable rock.

Other aspects and advantages will be apparent from the following description and the appended claims.

BRIEF DESCRIPTION OF DRAWINGS

FIG. 4 is a simplified flow diagram of a power conversion system useful with embodiments herein.

DETAILED DESCRIPTION

As described in the background section above, typical hydrothermal systems, as well as closed loop systems, have been focused on extracting heat from permeable geological resources where fractures or porosity occur either naturally or through stimulation. In contrast, embodiments disclosed herein may efficiently and effectively extract heat from low-permeability rock, such as rock in the plastic zone. Geologic formations including higher temperature low-permeable rock are advantageously used by passing a fluid through the resource without direct contact between the fluid and the rock, whereby heat is transferred directly from the rock through the well casing into the fluid.

Figure 1:
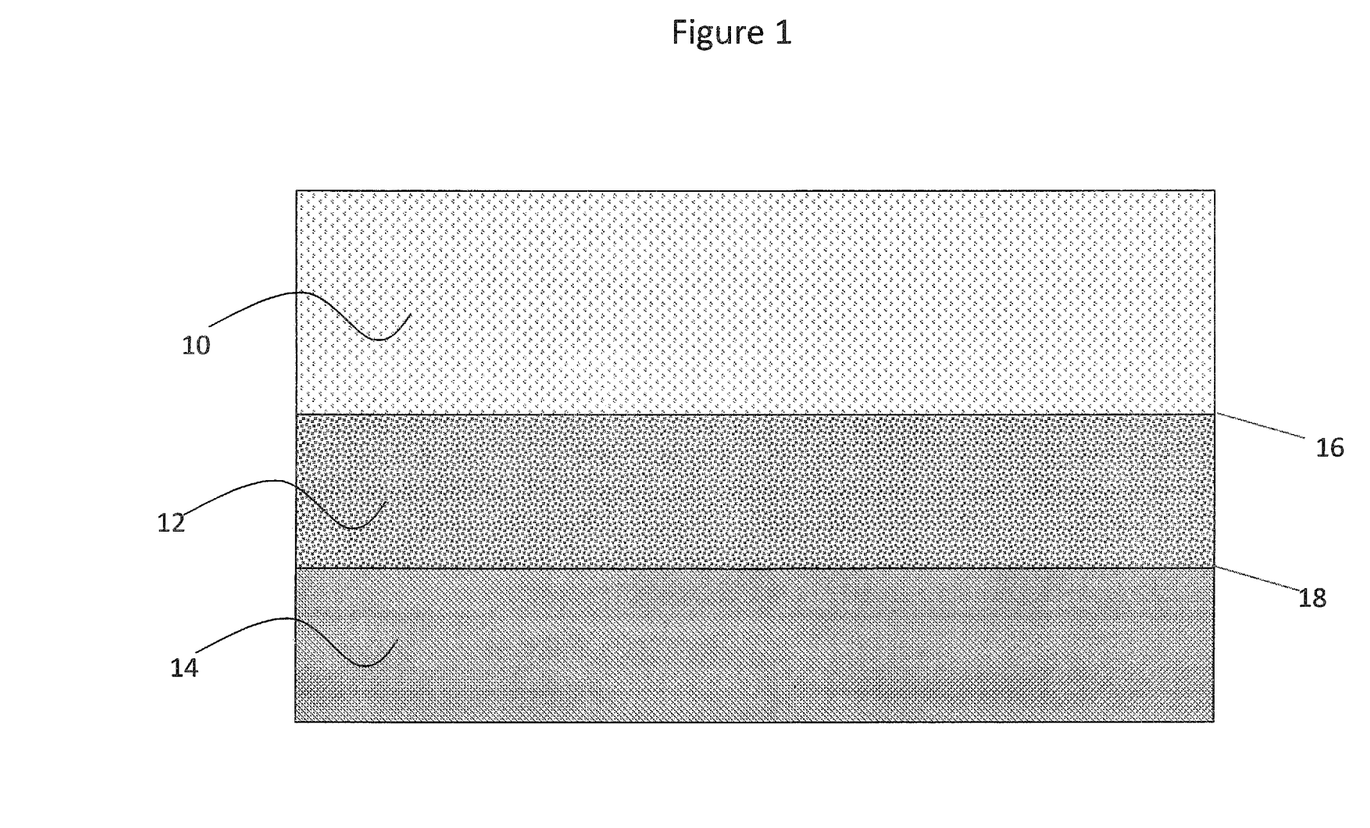
FIG. 1 is a simplified diagram illustrating rock formations that may be utilized according to embodiments herein.

The crust of the earth may be divided into zones based on the mode of deformation. The three zones of interest are shown in FIG. 1. These are the brittle zone 10, the brittle-ductile transition zone (or semi brittle zone) 12, and the plastic zone 14. These three zones are separated by two transitions, which are shown as lines 16, 18 in FIG. 1: the brittle-ductile transition (BDT) 16 and the brittle-plastic transition (BPT) 18. These three zones are further described as follows.

The brittle zone is the uppermost zone, which extends downward from the surface and is characterized by brittle deformation, such as occurs along fault lines. Underlying the brittle zone is the brittle-ductile transition zone, which is characterized by deformation that is a combination of brittle and ductile deformation. Underlying the brittle-ductile transition zone is the plastic zone, which is characterized by predominantly ductile deformation. The plastic zone may be immediately underlain by magma in areas of magnetic intrusion.

The strength of the rock increases with depth until somewhere near the top of the brittle-ductile transition zone, after which it decreases in strength with depth. The top of the brittle-ductile transition zone has the strongest rock within it because of the effects of confining pressure from overlying rock. Below that point, the strength of the rock decreases due to the effect of increasing ductile deformation as temperature increases.

The mode of deformation is primarily a function of effective stress from overlying rock, temperature and rock type. The effective stress increases with depth. The temperatures that define the plastic zone are indicated in the following table.

| Rock Type | Temperature Range at Which Plastic Deformation Begins | Temperature Range at Which Melting Begins |
|---|---|---|
| Felsic Rock | 350 to 400° C. | 1000 to 1200° C. |
| Mafic Rock | 500 to 800° C. | 1300 to 1700° C. |

Felsic rock most commonly includes granite, but may include many other similar types of rock relatively rich in quartz and feldspar. Sedimentary rocks, though not felsic, are relatively chemically comparable to felsic rocks and should be comparable to them in terms of melting point and the temperatures at which plastic deformation begins. Mafic rock most commonly includes basalt, but may include many other similar types of rock. Rocks intermediate in chemical and mineralogical composition to felsic and mafic rocks have temperature ranges intermediate to those listed in the above table.

The mode of deformation has a profound impact on the permeability of the rock. Rock within the brittle zone may have a permeability that ranges from $10^{-2}$ to $10^{-15}$ m$^2$. In the plastic zone, in contrast, the permeability typically ranges from $10^{-16}$ to $10^{-18}$ m$^2$. In turn, this affects the modes of heat and mass transfer within the rock. As a result, heat transfer within the brittle zone typically occurs as some combination of conduction and convection. However, within the plastic zone, where the permeability is too low, heat transfer occurs only as a result of conduction. This is due to plastic deformation within that zone such that any open fractures that occur are temporary only and will eventually reseal. Given the minimal ability for stimulation to increase permeability in most cases and the very low overall permeability of rock, such formations are generally considered by those skilled in the art as unsuitable for geothermal energy production. This is especially true in view of the long-term viability of the zone, as the resealing of any fractures, including those resulting from stimulation, result in the convective currents in the formation diminishing over time, negatively impacting the heat transfer.

It has been found, however, that sustainable geothermal energy production may in fact be achieved within such low permeability formations with a closed loop system. Sufficient heat may be withdrawn from a given formation via conduction, and although convective forces, in some embodiments, are not provided to promote replenishment of the heat proximate the closed loop system, the hot impermeable rock may have sufficient overall conduction replenishment to sustain energy production over long periods of time.

Geothermal wells according to embodiments herein may include a closed loop system containing a fluid. The closed loop system may include, for example, an injection (downward flowing) zone, a heat exchange zone for heating the fluid contained within the closed loop system, and a production (upward flowing) zone. At least a portion of the heat exchange zone may be disposed within a region of hot impermeable rock in some embodiments.

Hot impermeable rock, according to embodiments herein, may have a permeability of less than 1 millidarcy ($10^{-11}$ cm$^2$; $10^{-15}$ m$^2$). In some embodiments, hot impermeable rock may have a permeability of less than 0.1 millidarcy; less than 0.01 millidarcy in other embodiments; and less than 0.001 millidarcy in yet other embodiments.

Hot impermeable rock, according to embodiments herein, may have a temperature greater than 350° C. In some embodiments, hot impermeable rock may have a temperature greater than 500° C.; greater than 600° C. in other embodiments; greater than 650° C. in other embodiments; greater than 700° C. in other embodiments; greater than 750° C. in other embodiments; greater than 800° C. in other embodiments; greater than 850° C. in other embodiments; or greater than 900° C. in yet other embodiments, such as temperatures up to 1700° C., for example.

The viability of a particular formation, however, has been found to depend upon not only the temperature of the formation at which the heat exchange zone is disposed, but also the heat replenishment of the formation. It has been found that long term viability of a closed loop geothermal energy production system may be had where the heat exchange zone is disposed proximate a plastic zone or within a plastic zone having a minimum temperature gradient, representing a minimum flux of heat transferred into the zone of interest.

Figure 6:
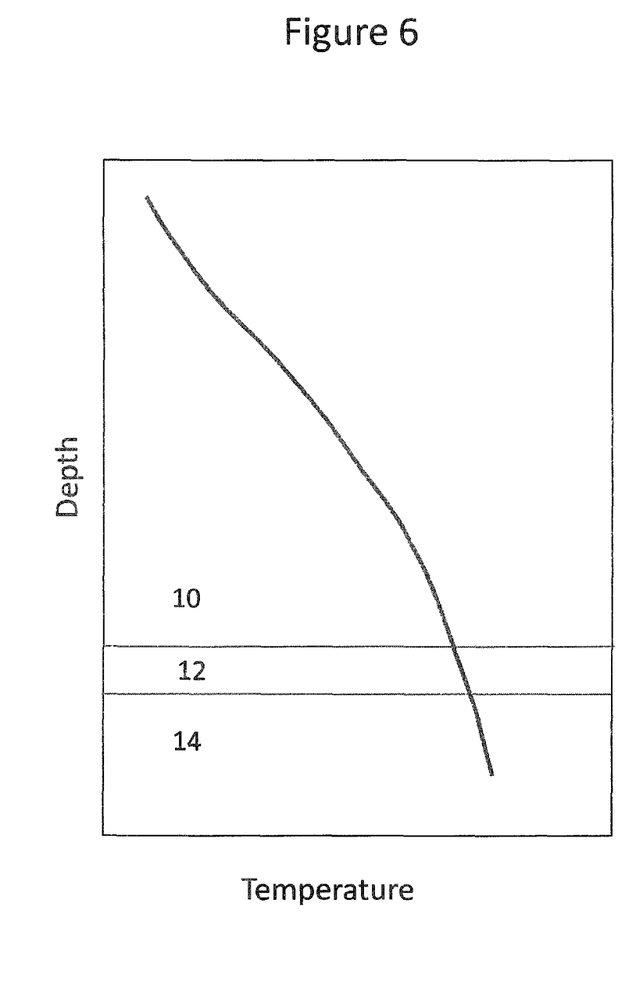
FIG. 6 is a typical temperature versus depth diagram for a deep resource with a small thermal gradient and a small heat flux to the surface.

As illustrated in FIG. 6, a typical temperature profile for the vast majority of geologic formations is plotted. Temperature increases steadily with depth throughout the brittle zone 10, the brittle-ductile transition zone 12, and increases linearly within the plastic zone 14. In a typical formation, such as illustrated in FIG. 6, the formation may exhibit a temperature gradient in the realm of 20° C. per kilometer, for example. This plot shows that at substantial depth, hotter temperatures can be found, and this type of formation is the type often referred to in the prior art when contemplating using extreme depths, such as 12000 meters, for example, or in those that mention that deeper and hotter is all that is necessary. Unfortunately, deeper is not cost effective, and hotter does not necessarily equate to long term viability of a formation, as localized heat depletion may result in decreased energy extraction and concomitant losses in geothermal loop energy conversion efficiencies.

Figure 7:
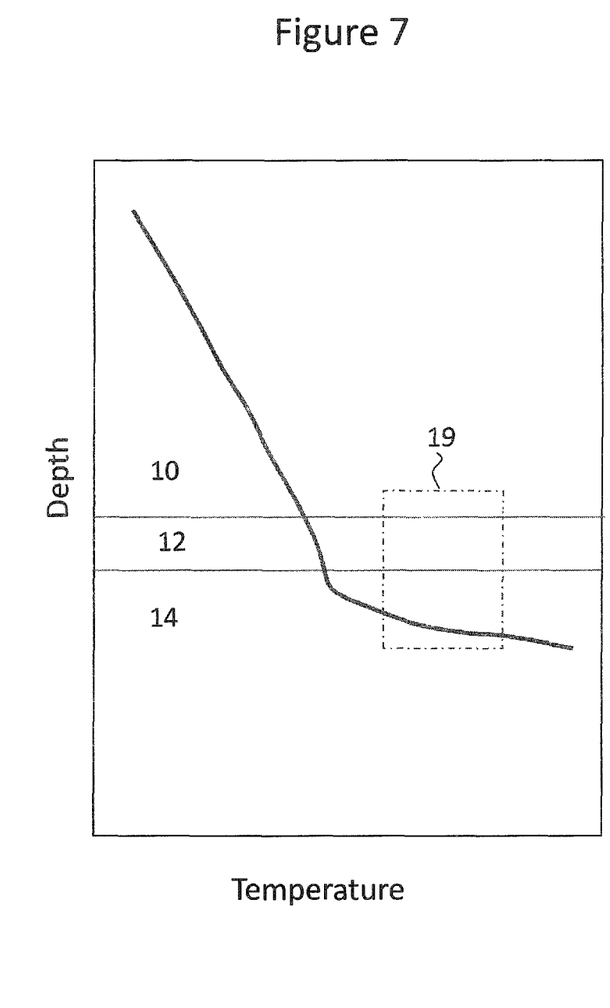
FIG. 7 is a temperature versus depth diagram for a productive thermal gradient and heat flux to the surface useful with embodiments herein.

In contrast, it has been found that a formation having a particular temperature profile may provide both the needed accessibility and heat replenishment characteristics to provide long term energy conversion viability. Such a formation may have, for example, a temperature profile similar to that as illustrated in FIG. 7. In FIG. 7 the temperature gradient (° C./km) in the plastic zone is substantially larger, which reflects a higher heat flux into the resource and upward to the surface. The change in the temperature profile above the plastic zone is indicative of convective heat transfer in the brittle zone. This is usually found in such resources, but it is not mandatory.

In some embodiments, closed loop geothermal systems according to embodiments herein may be disposed proximate to or within a plastic zone of a formation, where the plastic zone has a temperature gradient of at least 80° C. per kilometer depth; having a temperature gradient of at least 100° C. per kilometer depth in other embodiments; and having a temperature gradient of at least 120° C. per kilometer depth in yet other embodiments. A formation having a plastic zone with a sufficient temperature gradient has been found to provide sufficient driving force for replenishment of extracted heat. Further, the lower permeability of the brittle-ductile transition zone and/or the plastic zone having such a temperature profile may act as a "hot plate" lower boundary for upward convective loops of any ambient fluid located or emplaced within the brittle-ductile transition zone or the brittle zone proximate that "hot plate" lower boundary. For example, formations having a temperature profile such as that illustrated in FIG. 7 may exhibit a heat flux within and/or proximate the plastic zone of at least 0.2 W/m$^2$, such as greater than 0.3 W/m$^2$, greater than 0.4 W/m$^2$, greater than 0.5 W/m$^2$, greater than 0.6 W/m$^2$, or greater than 0.7 W/m$^2$.

Thus, a heat exchange zone of closed loop geothermal systems according to embodiments herein may be disposed, for example, within a plastic zone or within 1000 meters of the plastic zone, the plastic zone having a temperature gradient of at least 80° C. per kilometer depth; within 750 meters of a plastic zone having a temperature gradient of at least 80° C. in other embodiments; and within 500 meters of a plastic zone having a temperature gradient of at least 80° C. in yet other embodiments. In other embodiments, the closed loop geothermal system may be disposed within a region of rock having a temperature of at least 350° C., the region of rock being within a plastic zone or within 500 meters of the plastic zone, where the plastic zone has a temperature gradient of at least 100° C. per kilometer depth; within a region of rock having a temperature of at least 650° C. in other embodiments; and within a region of rock having a temperature of at least 700° C., at least 750° C., at least 800° C., at least 850° C., or at least 900° C. in yet other embodiments.

As noted above, with such a temperature profile, the formation may provide a "hot plate" effect, replenishing heat and providing for upward convective loops of any ambient fluid located or emplaced within the brittle zone or brittle-ductile transition zone proximate that "hot plate" lower boundary. A portion of a heat exchange zone of closed loop systems according to embodiments herein may be disposed within the brittle zone or brittle-ductile transition zone, provided the temperature of the brittle zone or brittle-ductile transition zone is sufficiently high and the temperature profile proximate the heat exchange zone of the closed loop system is sufficient to provide the necessary heat replenishment for long term system viability.

Closed loop systems according to embodiments herein may thus include one or more heat exchange zones for heating a fluid. For example, a single heat exchange zone may be used, or multiple heat exchange zones may be used. A single heat exchange zone may be disposed at a single or multiple depths and/or within single or multiple formation zones (brittle, brittle-ductile transition, or plastic). Alternatively, multiple heat exchange zones may be used, where at least a portion of the one or more of the heat exchange zones may be disposed within a brittle zone, a brittle-ductile transition zone, a plastic zone, or across multiple formation zones. The heat exchange zone may be oriented horizontally, vertically, or a combination of both horizontally and vertically.

For example, in some embodiments at least a portion of the one or more heat exchange zones may be disposed within a region of hot impermeable rock, the region of hot impermeable rock having a temperature gradient of at least 80° C. per kilometer depth. In other embodiments, the closed loop system may include one or more heat exchange zones for heating the fluid, wherein at least a portion of the one or more heat exchange zones is disposed within a subterranean region having a temperature of at least 350° C., the subterranean region being within a plastic zone or within 500 meters of the plastic zone, the plastic zone having a temperature gradient of at least 100° C. per kilometer depth. In some embodiments, at least a portion of the one or more heat exchange zones may be disposed within a brittle-ductile transition zone or within a plastic zone. In yet other embodiments, at least a portion of the one or more heat exchange zones may be disposed within the brittle zone; the brittle zone proximate the portion of the heat exchange zone may also have an enhanced permeability, for example stimulated so as to enhance the localized convective effects.

The high-temperature, low permeability rock may be present in the brittle zone 10, the brittle-ductile transition zone 12, or the plastic zone 14. For example, as illustrated in FIG. 7, a heat exchange zone or multiple heat exchange zones of a geothermal energy system may be disposed within an area 19, at an appropriate depth having sufficient temperature and heat replenishment characteristics. Long term viability of a well emplaced in such a location is provided in view of the temperature, and maintenance of the temperature even as heat is being extracted from the formation.

Such a location is distinguished over a similar area for a formation having a temperature-depth profile similar to that as illustrated in FIG. 6, as the gradient is insufficient for long term viability, the formation having insufficient heat replenishment characteristics, which is typically an order of magnitude lower, 0.03 to 0.06 W/m². As noted earlier, deeper and hotter does not necessarily mean better. A formation having a temperature of 500° C. and a heat flux of 0.05 W/m² would be depleted promptly, the well having no long term viability for energy production.

As noted above, the closed loop well system may include a downward flowing zone (injection zone), a heat exchange zone, such as an angled, upward, or cross-flowing heat exchange zone, and an upward flowing zone (production zone). Closed loop networks contemplated include, among others, "U-shaped" well networks (down, overt, up), "L-shaped" well networks (down, over, back, up), "W-shaped" well networks (down, up, down, up), "straw" networks (down, up), and various combinations and configurations of these. In some embodiments, the cross-flowing heat exchange zone or a portion thereof is disposed in the region of hot impermeable rock. In other embodiments, a portion of two or more of the downward flowing zone, the cross-flowing zone, and the upward flowing zones is disposed in the region of hot impermeable rock. A portion of the closed loop well system may be disposed in a brittle zone, a brittle-ductile transition zone, or a plastic zone. In some embodiments, at least a portion of the closed loop well system is disposed in a plastic zone.

In some embodiments, a portion of each of the downward flowing zone, the heat exchange zone, and the upward flowing zone extends within a region of hot impermeable rock not containing significant natural fractures, fissures, or voids. In yet other embodiments, a portion of each of the downward flowing zone, the heat exchange zone, and the upward flowing zone extends within a region of hot impermeable rock not containing significant natural or man-made fractures, fissures, or voids. As used herein, "significant" refers to a quantity sufficient to result in the local permeability of the hot impermeable rock proximate an area of the system being greater than 1 millidarcy.

Extracting heat from such hot impermeable rock requires that the fluid can pass through the resource. The closed loop system, or at least appropriate portions thereof, should thus be formed of materials sufficient to handle the temperatures of the fluid as well as to withstand the pressures that may be encountered.

Figure 2:
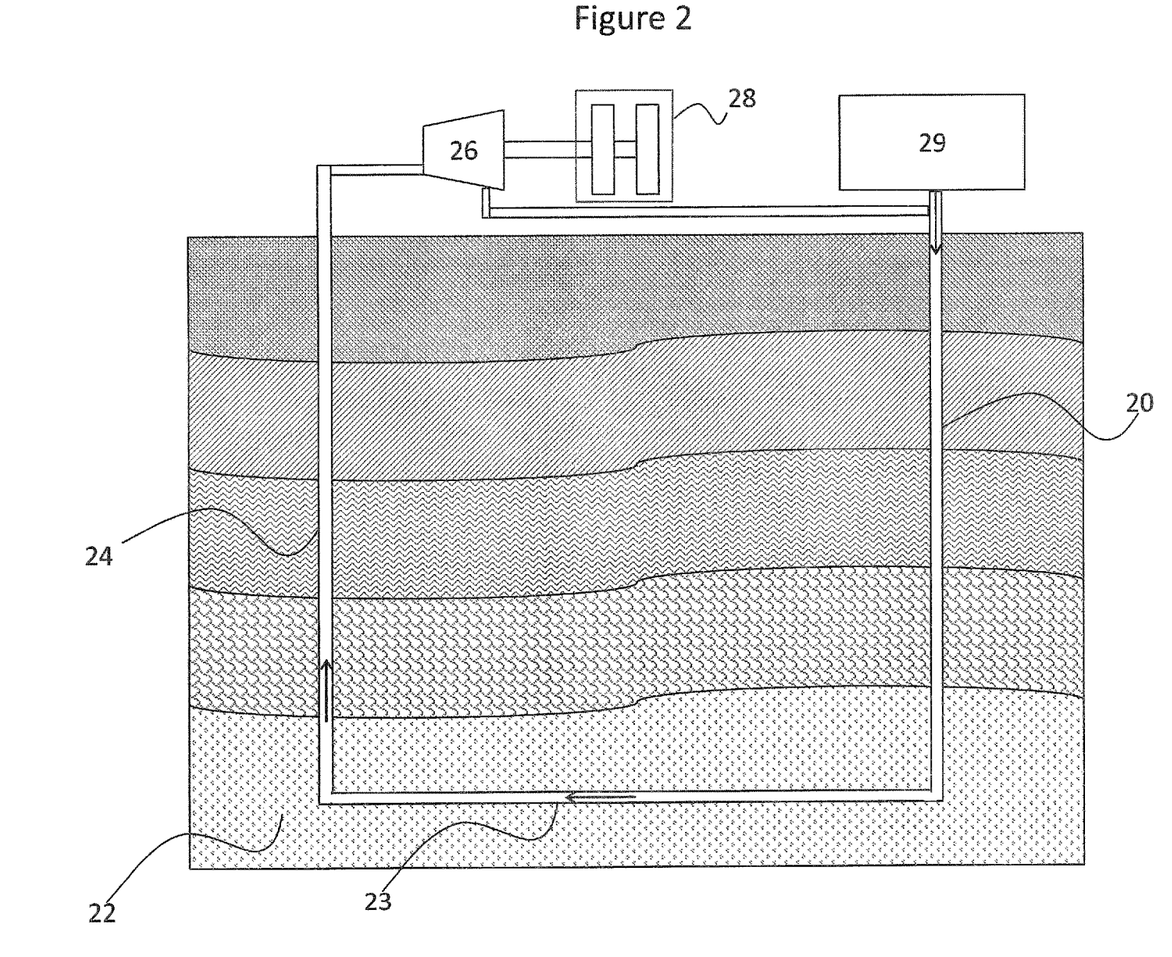
FIG. 2 is a simplified flow diagram of a geothermal system according to embodiments herein.

In some embodiments, such as illustrated in FIG. 2, the closed loop system for converting geothermal energy may include a generally U-shaped system. Two or more wells may be conjoined in a "U-shaped" or "W-shaped" configuration. If more than two wells are used, the additional wells may be smaller-diameter wells that may be at a horizontal or near-horizontal level that branch out and in some cases rejoin between the larger parent wells. In such a system, for example, a fluid may be passed down a common or multiple injection wells 20, energized within a subsurface zone 22 of hot impermeable rock in heat exchange zone 23, and the energized fluid, which may have an increased temperature and an increased pressure, is recovered via a common or multiple production wells 24. The energized fluid may then be converted to energy, such as electricity, via a turbine 26 and a generator 28. The system may also include pressure regulation and injection control equipment, generally designated at 29.

Figure 3:
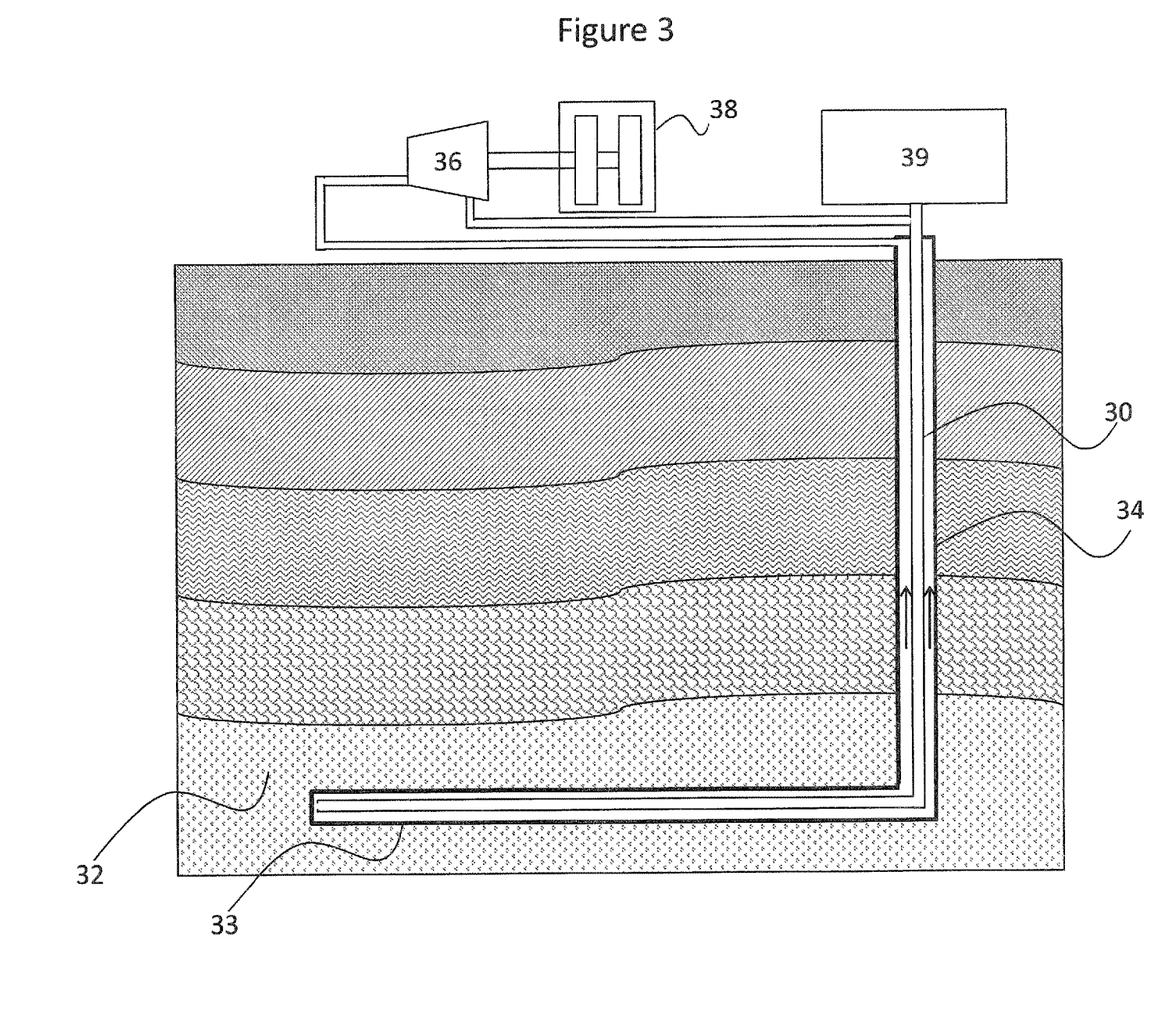
FIG. 3 is a simplified flow diagram of a geothermal system according to embodiments herein.

In other embodiments, the downward flow and upward flow may be contained within a single well (such as for an "L-shaped" or "straw" network). These flows may be contained within concentric pipes, for example, separated by insulation or vacuum so as to minimize heat losses in the recovered fluid. Such wells may be vertical or initially vertical but transitioning into a non-vertical section. For example, as illustrated in FIG. 3, a fluid may be passed down an injection zone 30, energized within a subsurface zone 32 of hot impermeable rock in heat exchange zone 33, and the energized fluid, which may have an increased temperature and an increased pressure, may be recovered via a production zone 34. The energized fluid may then be converted to energy, such as electricity, via a turbine 36 and a generator 38. The system may also include pressure regulation and injection control equipment, generally designated at 39.

Although illustrated in FIG. 2 and FIG. 3 as being disposed in a relatively vertical and horizontal orientation, the pipe sections may include vertical, horizontal and/or angled sections. In other embodiments, all three zones may be contained within one vertical well system consisting of two pipes side-by-side or coaxial, separated by insulation. In yet other embodiments, all three zones are contained within one well system that separates into multiple approximately horizontal wells within hot low-permeability rock that rejoin prior to connecting to the production zone. Another architecture consists of two or more wells conjoined in a U-shaped configuration, where the additional wells may be smaller-diameter wells at a horizontal or near-horizontal level that branch out and then rejoin between the larger parent wells.

Regardless of the configuration of the heat exchange zone, embodiments herein contemplate use of the heated fluid in either a direct or indirect power conversion system, such as a dry steam, flash, or binary system. Embodiments of such systems may be exemplified by those illustrated in FIGS. 4 and 5, for example.

In the embodiment illustrated in FIG. 4, the power generation system may include a system including an injection zone 40, a production zone 42, and a heat exchange zone (not illustrated) disposed in hot impermeable rock. The system may also include a flash tank 44, a turbine 45, a heat rejection system 46, and injection pumps 47. The heated fluid recovered from the production zone 42 is directed through a unit 48 that decreases the pressure, which allows a portion of the fluid to flash. The vapor is directed through one or more turbines to generate power, recompressed or condensed, and then recirculated through the closed loop system. The remaining fluid is reinjected into the reservoir directly. In some cases, the fluid is first sent to a binary plant to generate more power and then recirculated through the closed loop system.

Figure 5:
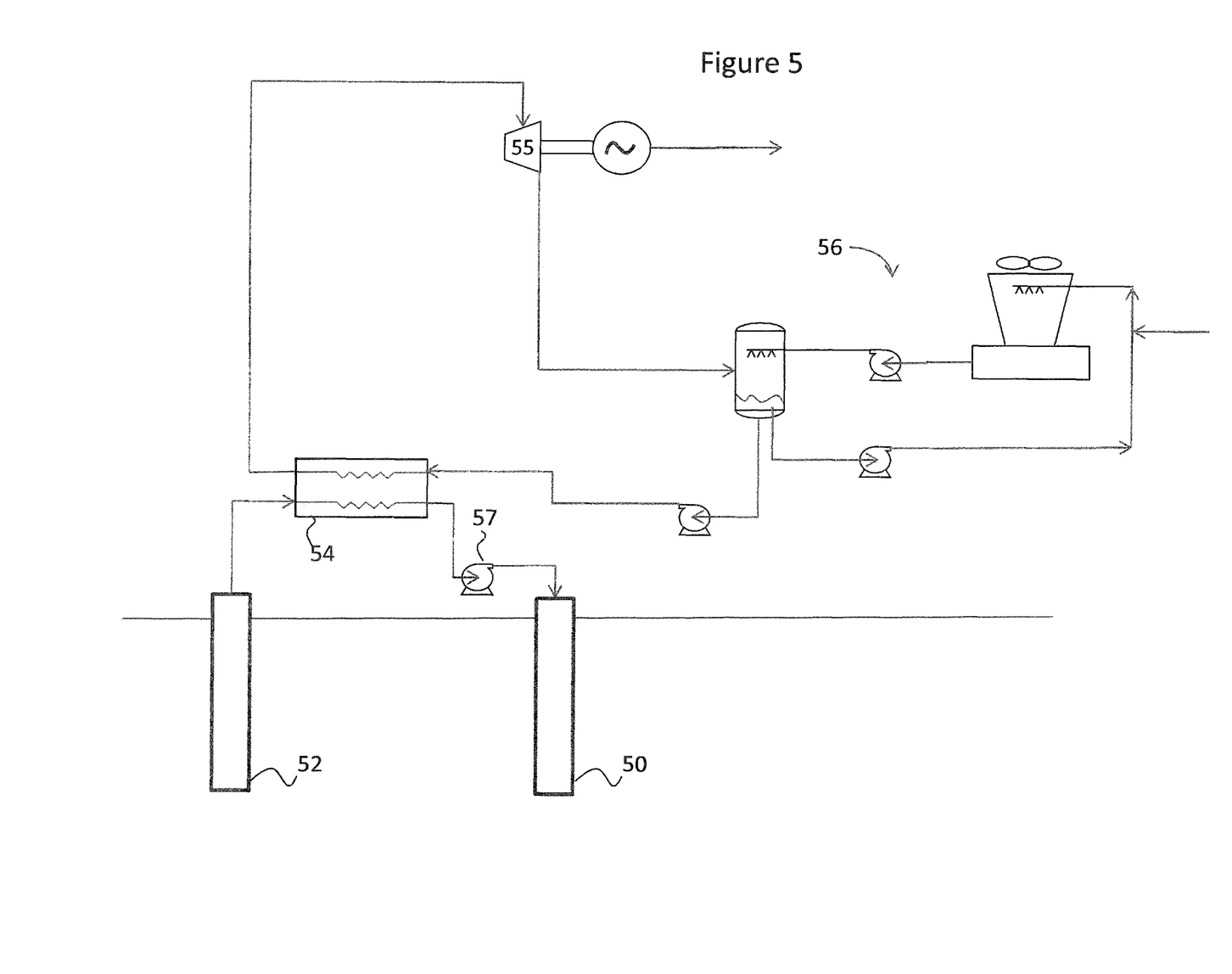
FIG. 5 is a simplified flow diagram of a power conversion system useful with embodiments herein.

In the embodiment illustrated in FIG. 5, the power generation system may include a closed loop system including an injection zone 50, a production zone 52, and a heat exchange zone (not illustrated) disposed in hot impermeable rock. The system may also include a heat exchanger 54, an Organic Rankine Cycle power system 55, a heat rejection system 56, and injection pump 57. The heated fluid recovered from the production zone is directed through heat exchanger 54, in which the heat is transferred to a second fluid with a relatively low boiling point. The second fluid then vaporizes and is directed through a turbine 55 to generate power, such as one using an Organic Rankine Cycle (ORC). Thereafter, the second fluid is condensed or compressed, such as by being passed through the heat rejection system 56, and recycled. The fluid, following heat exchange, is recirculated through the closed loop system.

The fluid contained within the closed loop system may include water, carbon dioxide, a refrigerant, or a light hydrocarbon, for example. In some embodiments, the fluid is sufficiently compressible such that the fluid has a higher average density in the downward flowing zone than it does in the upper flowing zone, producing a thermosiphon effect. The well system in high-temperature, low-permeability rock should be sufficient depth to create a strong thermosiphon where the density of the closed loop fluid going downward is higher than the density of the closed loop fluid going upward. At minimum, the depths should range from 2 km to 6 km or greater. In some embodiments, the system may be disposed to depths of 8 km or greater, 9 km or greater, 10 km or greater, 11 km or greater, or even 12 km or greater. In some embodiments, the thermosiphon effect may provide sufficient driving force for continued circulation of the fluid through the closed loop system, and injection pumps may only be required during start up.

As described above, methods for producing power according to embodiments herein may include disposing a closed loop system within a subterranean formation. The closed loop system may include an injection (downward flowing) zone, a heat exchange zone for heating a fluid contained within the closed loop system, and a production (upward flowing) zone. At least a portion of the heat exchange zone may be disposed within a region of hot impermeable rock. For example, the hot impermeable rock may have a permeability of less than 0.1 millidarcy and a temperature of greater than 650° C.

A fluid may be injected into the injection zone and circulated through the heat exchange zone to produce a heated fluid, which may be recovered from the production zone. Thermal energy contained in the recovered heated fluid may then be converted in a power production facility. In some embodiments, disposing of the system within the subterranean formation may include disposing a portion of the closed loop well system in a brittle zone, a brittle-ductile transition zone, or a plastic zone, as described above. In some embodiments, disposing of the system below the plastic zone allows for the collection of heat from below the boundary of the brittle-ductile transition zone and the plastic zone such that the generally higher thermal gradient of the rock in the plastic zone can be utilized and those characteristics will more than justify the additional cost of drilling into the plastic zone.

While hot impermeable rock in embodiments herein may be in the plastic zone, where stimulation may be ineffective, systems herein may also benefit from stimulation. For example, stimulating rock in the brittle zone proximate the closed loop well system may be used to increase the convective flow of water or brine outside the well to enhance the heat transfer from the hot brittle/ductile transition zone below to the process fluid flowing through portion of the system in the brittle zone. Similarly, stimulating rock in the brittle-ductile transition zone proximate the closed loop well system may be used to increase the convective flow of water or brine outside the well to enhance the heat transfer from the hot plastic zone below to the process fluid flowing through the portion of the system in the brittle/ductile transition zone.

According to other embodiments, methods for producing geothermal energy described herein may include determining a temperature profile of a subterranean formation. For example, a well or an exploratory (small diameter) well may be drilled, and the temperature of the formation may be measured either while drilling or subsequent to drilling, so as to allow the well to come to or approach equilibrium with the surrounding formation following disturbance. The measurements of the drilling fluid temperature during or subsequent to drilling may be used to estimate the formation temperature from the borehole measurements. For example, the temperature profile may be estimated using various models taking into account the borehole geometry, position of sensors, the drilling fluid composition, and other numerous factors, including the shut-in period, circulation rates, depth of measurement, thermal diffusivity of the system, and thermal conductivity, among other factors.

In other embodiments, a temperature profile for a formation may be estimated. For example, where temperature data exists for a shallow well, seismology and other data may be used to extrapolate the temperature profile of the formation at greater depths, as well as estimating the location of the brittle-ductile transition zone and the start of the plastic zone.

Additionally, a heat replenishment profile of the subterranean formation as a function of depth may be determined. For example, the heat flux of a subterranean formation may be determined via measurements and calculations, such as by measuring the change in temperature at a location over time following shut-in or end of circulation, a higher rate of approach to equilibrium being indicative of a higher heat flux. The heat replenishment profile may also take into account, for example, formation type, formation temperature gradient, and other factors that are indicative of the manner in which the formation replaces heat or responds to disturbances. In this manner, one skilled in the art can measure, calculate, and/or estimate the heat replenishment profile of a subterranean formation.

In some embodiments, determining the heat replenishment profile of the subterranean formation may include estimating a convective effect of locally enhancing the permeability of the formation. Fracturing or stimulating a formation, such as in the brittle zone above a "hot plate" brittle-ductile transition zone or plastic zone, may provide for enhanced convection and heat replenishment. Estimation of the effect of locally enhancing the permeability of the formation in such an area may provide further information on which to base the location of a geothermal well loop heat exchange zone as well as aid in determination of the long term viability of a well at such a location.

The method may further include determining a location for emplacement of the closed loop geothermal heat exchange system. As briefly alluded to above, the temperature profile, heat replenishment profile, etc., may be used to determine where a heat exchange zone or zones of a closed loop geothermal system may be located to effectively and efficiently extract heat from the formation for energy production. For example, determining a location may include plotting a region having a temperature of at least 350° C., the region being within a plastic zone or within 1000 meters of the plastic zone, and the plastic zone having a temperature gradient of at least 80° C. per kilometer depth. In other embodiments, determining a location may include plotting a region having a temperature of at least 650° C., the region being within a plastic zone or within 500 meters of the plastic zone, the plastic zone having a temperature gradient of at least 100° C. per kilometer depth.

A closed loop geothermal heat exchange system may then be disposed within the subterranean formation based on the determined temperature profile and the determined heat replenishment profile of the subterranean formation. Emplacement of the closed loop geothermal heat exchange system may include drilling, casing, perforating, cementing, expanding uncased well walls with fractures, sealing uncased well walls and other steps associated with a drilling process and emplacement of a well loop therein as known to one skilled in the art. The emplacing may include, in some embodiments, disposing a heat exchange zone of the closed loop well system within a plastic zone or a brittle-ductile transition zone of the formation. In some embodiments, the emplacing may include or additionally include disposing a heat exchange zone of the closed loop well system within a brittle zone of the formation, as well as stimulating the brittle zone proximate the heat exchange zone.

According to some embodiments, methods for producing geothermal energy described herein may include portions of wells that are not cased with metal pipe but, instead, the walls of such portions may be formation rock that has been sealed with hardened sealant and the well wall in such portions being defined by the boundary of such hardened sealant which, in some embodiments, will cause the diameter of the well in such portions to be larger, and in some cases much larger, than in the metal cased portion of such wells.

Following emplacement of the closed loop heat exchange system, a fluid may be circulated through the closed loop geothermal heat exchange system to heat the fluid and to produce energy with the heated fluid. For example, the energy extracted from the subterranean formation may be converted to heat, electricity, or other usable forms of energy as known to those skilled in the art.

In addition to determining a temperature profile and the heat replenishment profile, methods according to embodiments herein may further estimate a long term viability of a formation for producing geothermal energy based upon the temperature profile and the heat replenishment profile. Such an analysis may be performed by simulating performance of a well as a function of time, taking into account such variables as temperature, heat flux, plastic deformation of the formation proximate the well over time, and other factors, to estimate the changes in energy extraction and energy conversion efficiencies of the system over time. Such an analysis may also be performed to compare various portions of a given formation to determine one or more suitable locations for disposal of the heat exchange loop.

As described above, embodiments disclosed herein relate to apparatus and methods for extracting heat from high temperature impermeable geological formations, lacking in fractures or porosity either naturally occurring or through stimulation. Contrary to prior teachings and the consensus indicating some degree of permeability, and hence convection, is required for effective heat transfer and power production, the present inventors have found that hot impermeable rock may provide an efficient and sustainable resource for extracting geothermal energy to produce electricity, for example.

The extraction of heat from permeable rock is challenging per se, as the effectiveness of the system depends on accessing sufficient permeability through which water can flow. Despite efforts to reliably locate such locations from the surface it has proved difficult in practice to pinpoint the right geological attributes without drilling—sometimes many wells. The high cost of drilling prohibits installing too many wells. Therefore, there is enormous financial risk that the wells that are drilled will be nonproductive (i.e., low flow or dry holes) due to a lack of permeability. In contrast, closed loop systems according to embodiments herein, while possibly including a higher initial drilling cost, have an effectiveness and a power conversion efficiency that far outweigh the drilling costs.

While the disclosure includes a limited number of embodiments, those skilled in the art, having benefit of this disclosure, will appreciate that other embodiments may be devised which do not depart from the scope of the present disclosure. Accordingly, the scope should not be limited to the attached claims.

What is claimed:

1. A geothermal well, comprising:
    a closed loop system containing a fluid, the closed loop system including one or more heat exchange zones for heating the fluid,
    wherein at least a portion of one or more of the heat exchange zones is disposed within a subterranean region comprising hot impermeable rock not containing significant natural or man-made fractures, fissures, or voids and having a temperature of at least 350° C., the subterranean region being within a plastic zone or within 1000 meters of the plastic zone, the plastic zone having a temperature gradient of at least 80° C. per kilometer depth.

2. The geothermal well of claim 1, wherein the plastic zone has a temperature gradient of at least 100° C. per kilometer depth.

3. The geothermal well of claim 1, wherein the subterranean region proximate the closed loop system has a heat flux of at least 0.20 W/m$^2$.

4. The geothermal well of claim 1, wherein a portion of the closed loop system is disposed in a brittle zone or a brittle-ductile transition zone.

5. The geothermal well of claim 1, wherein the portion of one or more of the heat exchange zones is disposed in the subterranean region comprising hot impermeable rock having a temperature of at least 650° C. and a permeability of less than 1 millidarcy.

6. The geothermal well of claim 1, wherein the closed loop system includes a downward flowing zone, the one or more heat exchange zones, and an upward flowing zone.

7. The geothermal well of claim 6, wherein a portion of two or more of the downward flowing zone, the one or more heat exchange zones, and the upward flowing zone is disposed in the region of hot impermeable rock.

8. The geothermal well of claim 7, wherein a portion of each of the downward flowing zone, the one or more heat exchange zones, and the upward flowing zone extends within the region of hot impermeable rock not containing significant natural or man-made fractures, fissures, or voids.

9. The geothermal well of claim 1, wherein at least a portion of one or more of the heat exchange zones is disposed within a brittle zone or a brittle-ductile transition zone, wherein the brittle zone or the brittle-ductile transition zone proximate the portion of one or more of the heat exchange zones has an enhanced permeability.

10. A method for producing power, comprising:
    providing a closed loop system including an injection zone, a heat exchange zone for heating a fluid contained within the closed loop system, and a production zone, wherein the heat exchange zone or a portion thereof is disposed within a subterranean region comprising hot impermeable rock not containing significant natural or man-made fractures, fissures, or voids and having a temperature of at least 350° C., the subterranean region being within a plastic zone or within 1000 meters of the plastic zone, the plastic zone having a temperature gradient of at least 80° C. per kilometer depth;

injecting the fluid into the injection zone;
circulating the fluid through the heat exchange zone to produce a heated fluid;
recovering the heated fluid from the production zone; and
converting thermal energy contained in the recovered heated fluid in a power production facility.

11. The method of claim 10, wherein the hot impermeable rock has at least one of a temperature of at least 650° C., a temperature gradient of at least 100° C. per kilometer depth, and a permeability of less than 0.1 millidarcy.

12. The method of claim 10, wherein a portion of the closed loop system is disposed in a brittle zone or a brittle-ductile transition zone.

13. The method of claim 12, further comprising stimulating rock in the brittle zone and/or stimulating rock in the brittle-ductile transition zone proximate the closed loop system.

14. The method of claim 10, wherein the subterranean region is within the plastic zone or within 500 meters of the plastic zone, the plastic zone having a temperature gradient of at least 100° C. per kilometer depth.

15. The method of claim 10, further comprising:
determining a temperature profile of a subterranean formation;
determining a heat replenishment profile of the subterranean formation as a function of depth;
determining a location for emplacement of the closed loop system;
estimating a long term viability of the subterranean formation for producing geothermal energy based upon the temperature profile and the heat replenishment profile; and
emplacing the closed loop system within the subterranean formation based on the temperature profile and the heat replenishment profile of the subterranean formation.

16. The method of claim 15, wherein the determining the heat replenishment profile of the subterranean formation comprises estimating a convective effect of locally enhancing the permeability of the formation.

17. The method of claim 15, wherein the determining the location comprises plotting a region having a temperature of at least 350° C., the region being within the plastic zone or within 1000 meters of the plastic zone, the plastic zone having a temperature gradient of at least 80° C. per kilometer depth.

18. The method of claim 15, wherein the determining the location comprises plotting a region having a temperature of at least 650° C., the region being within the plastic zone or within 500 meters of the plastic zone, the plastic zone having a temperature gradient of at least 100° C. per kilometer depth.

* * * * *